Figure 1:
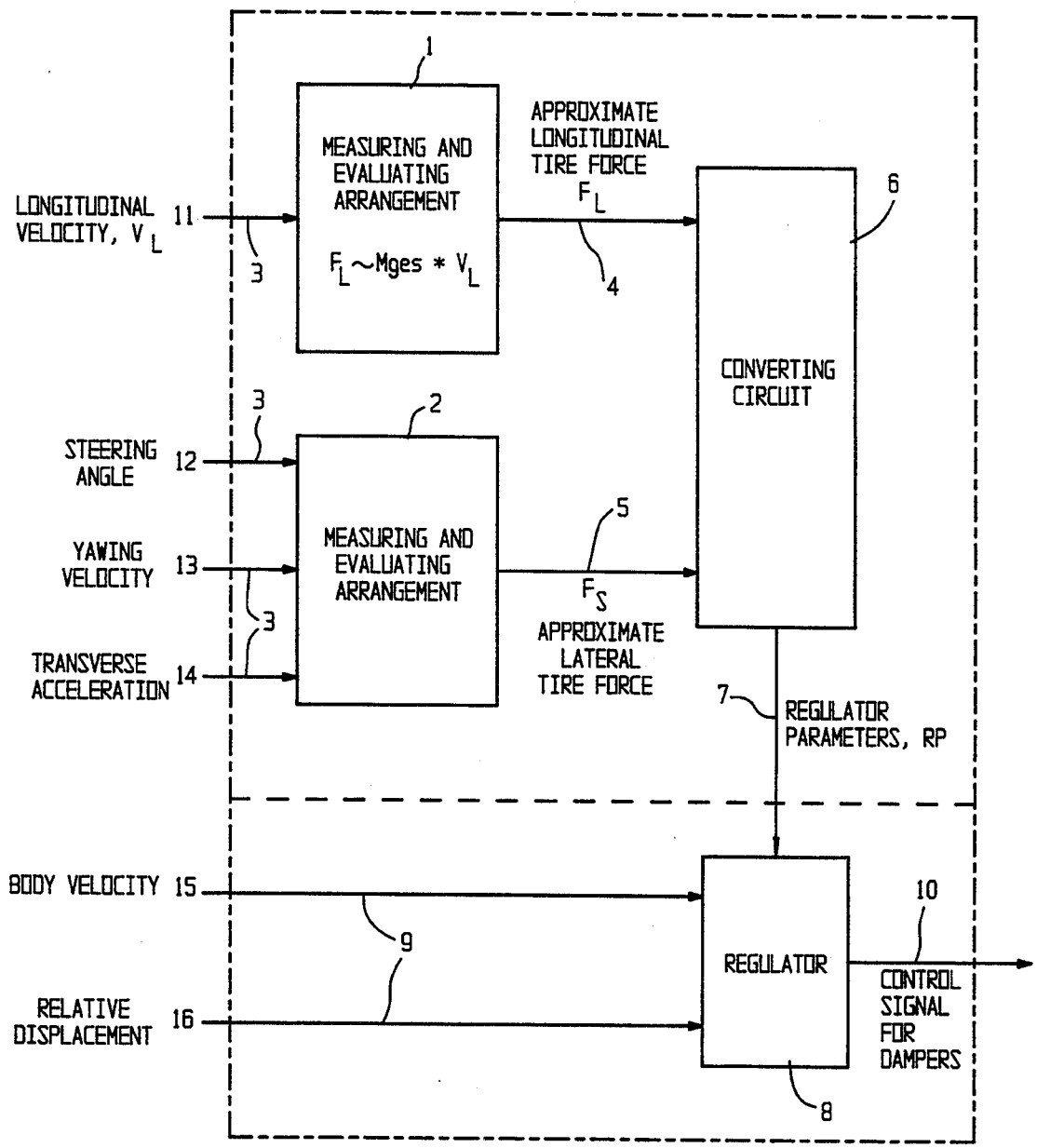

United States Patent [19]

Kunz et al.

[11] Patent Number: 5,383,124
[45] Date of Patent: Jan. 17, 1995

[54] PROCESS FOR UNDERCARRIAGE REGULATION

[75] Inventors: Dieter Kunz; Rainer Kallenbach, both of Stuttgart, Germany

[73] Assignee: Robert Bosch GmbH, Stuttgart, Germany

[21] Appl. No.: 971,686

[22] Filed: Nov. 4, 1992

Related U.S. Application Data

[63] Continuation of Ser. No. 623,934, Dec. 14, 1990, abandoned.

[30] Foreign Application Priority Data

May 20, 1989 [DE] Germany ............................ 3916460

[51] Int. Cl.⁶ .......................................... B60G 17/015
[52] U.S. Cl. ................................. 364/424.05; 280/707
[58] Field of Search .................... 364/424.01, 424.05; 280/707, 840

[56] References Cited

U.S. PATENT DOCUMENTS

| | | | |
|---|---|---|---|
| 4,865,347 | 9/1989 | Fukushima et al. | 280/707 |
| 4,888,696 | 12/1989 | Akatsu | 364/424.05 |
| 4,903,983 | 2/1990 | Fukushima et al. | 280/707 |
| 4,907,154 | 3/1990 | Yasuda et al. | 364/424.05 |
| 4,916,632 | 4/1990 | Doi et al. | 364/424.05 |
| 4,937,748 | 6/1990 | Yonekawa et al. | 364/424.05 |
| 4,949,262 | 8/1990 | Buma et al. | 364/424.05 |
| 5,089,966 | 2/1992 | Fukushima et al. | 364/424.05 |

FOREIGN PATENT DOCUMENTS 0311131 4/1989 European Pat. Off.
60-27903 2/1985 Japan.

OTHER PUBLICATIONS

Journal of Engineering for Industry, pp. 619–626, May, 1974, "Vibration Control for Industry Using Semi-Active Force Generations," Karnopp et al.
SAE 82983, Dec. 1990, pp. 9–17, "Control of Semi-Active Dampers Using Relative Feed Back Signals", Jolly et al.
Automotive Engineering, vol. 12, "Research and Development," Dec. 1987.

Primary Examiner—Vincent N. Trans
Attorney, Agent, or Firm—Baker & Daniels

[57] ABSTRACT

The invention relates to a process for the undercarriage regulation of vehicles, especially of passenger and utility motor vehicles, in which the undercarriage properties are varied in dependence on the particular sensor-determined traveling state by the regulating system. For an adaptation of the undercarriage tuning to the various requirements in respect to traveling comfort and traveling safety it is provided that the regulator parameters (R) of the regulating circuit are automatically varied in dependence on the dynamics of the traveling process.

11 Claims, 2 Drawing Sheets

PROCESS FOR UNDERCARRIAGE REGULATION

This is a continuation of application Ser. No. 07/623,934, filed Dec. 14, 1990 now abandoned.

STATE OF THE ART

The invention relates to a process for undercarriage regulation, especially of passenger and utility cars, in which the undercarriage properties are varied by the regulating system in dependence on the particular sensor-determined traveling state.

In the vehicle types today, especially passenger cars and buses, the undercarriage properties are optimized for a mean operating case. The properties are established by the construction and—aside from aging manifestations—remain unaltered in traveling operation. Since in extreme operating cases, for example in the case of the empty or fully loaded vehicle, and/or extremely changing traveling states (rapid curve driving, strong braking or acceleration) they possibly cannot satisfy high safety requirements, it is a known practice to switch over between different deeper settings. An automatic adjustment for different road states or manners of driving in a fine adjustment is not possible, since a shifting of the damper properties occurs only in coarse stages.

Further it is a known practice to engage parallel to a a spring arranged between axle and chassis (vehicle superstructure) a damper which operates actively or semi-actively. The active damper (shock absorber) presents a cylinder that is subdivided by means of a piston into two working chambers. By active pressure-medium feed or a letting off of the pressure medium the damper properties can be controlled. Alternatively, in a semiactive system it is possible to vary the damper properties by a by-pass controllable in cross section. For example, the piston can have a value controllable in passage cross section. In the semi-active system no active control of the pressure-medium flow takes place.

ADVANTAGES OF THE INVENTION

The process of the invention presents, in contrast, the possibility of how, in a simple manner and without inertia, in dependence on the dynamics of the traveling process, it is possible automatically to attune the undercarriage to the differing requirements in respect to traveling comfort and traveling safety. This occurs through a corresponding variation of the regulator parameters. Consequently, the particular transfer function of the regulator is adapted to the dynamics of the traveling process, so that in uncritical vehicle states there is present the greatest possible comfort, and in critical traveling states there is present a rigid attuning of the undercarriage, serving for safety.

Preferably for the recognition of the vehicle state there are detected the longitudinal and transverse dynamics of the vehicle.

Proceeding from uncritical traveling states, there occurs on arising of critical traveling states a continuous or stepped transition of an interpretation of the regulator parameters oriented on driving safety. There is given, accordingly, a continuous influence-taking, which is realized by means of correspondingly continuously adjustable actuators. Here there can be used the active or semi-active system described earlier.

According to a further development of the invention, for the detection of the longitudinal dynamics of the vehicle the longitudinal velocity of the vehicle is drawn upon and/or the longitudinal acceleration of the vehicle. From these magnitudes characteristic for the longitudinal dynamics there can be determined an approximate value for the tire longitudinal forces. Thus, for example, by differentiation of the vehicle speed there can be obtained an approximate value for the tire longitudinal forces.

For the detection of the vehicle's transverse dynamic it is preferable to draw upon the vehicle's transverse acceleration and/or the yawing velocity and/or the steering angle. From the transverse dynamics of the vehicle there can then be determined an approxmate value for the lateral forces of the tires. Here, if need be there are to be considered the oblique running angle and the tire oblique running rigidity.

According to a further development of the invention the approximation values of the tire longitudinal and tire lateral forces are drawn upon for the establishment of the regulator parameters. There the transformation of the approximation values of the tire longitudinal and tire lateral forces into the regulator parameters can occur over a stored value table or a computing operation.

The total system is distinguished in that the regulator parameters are fed to a regulator of the regulating circuit which receives as input values one or more velocities of the vehicle superstructure in vertical direction and/or one or more springing-in paths of the undercarriage and, with its output value regulates the damping properties of at least one damper of the undercarriage. The adaptation according to the invention, of the regulator parameters to the particular traveling state makes possible the coupling with virtually any undercarriage regulating system in which discretely or continuously adjustable actuators can be used. Critical driving maneuvers are detected and they lead of an undercarriage attuning increasing the safety, while in uncritical situation the greatest possible comfort is present. Moreover, simple and physically interpretable decision criteria are given for the characterization of the traveling behavior and the adaptation of the regulator parameters.

DRAWING

The invention is explained in detail in the following with the aid of the figures.

Figure 2:
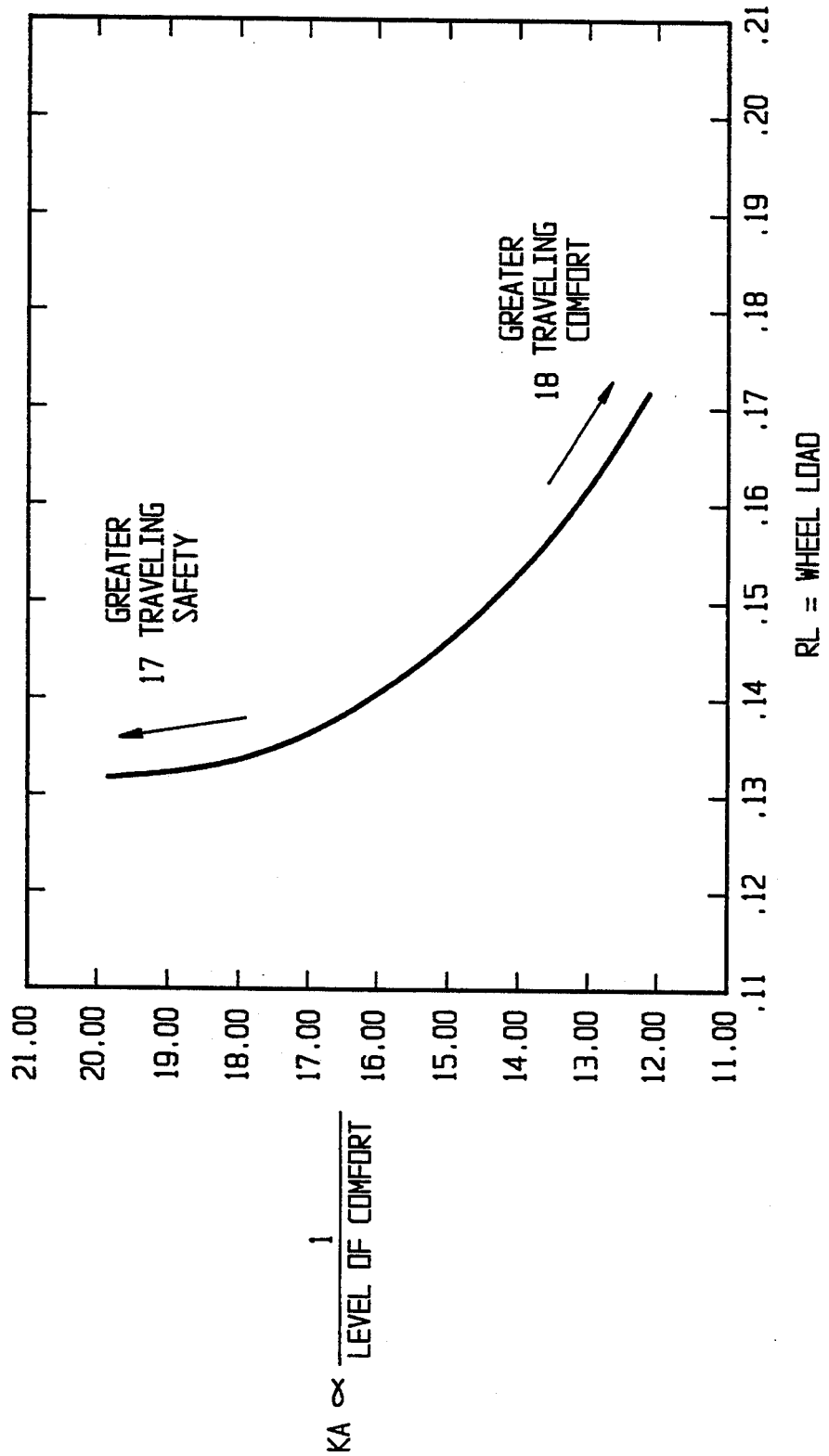

FIG. 1 shows a block circuit diagram with clarifies the process of the invention for undercarriage regulation and FIG. 2 shows a diagram which shows the comfort figure of an undercarriage in dependence on the wheel load, a limit curve being represented, the values of which can be assumed by variation of the regulator parameters.

With the aid of the block circuit diagram of FIG. 1, the process of the invention is to be explained. Two measuring arrangements 1 and 2 are provided to which there are fed input values 3 and whose outputs 4 and 5 are connected with a converting circuit 6. The output 7 of the converting circuit 6 is connected to a regulator 8, to which input values 9 are fed and which has an output 10. The regulator 8 is a component of a regulating circuit (not represented) of an undercarriage regulating system of a motor vehicle.

With the measuring and evaluating arrangement 1 it is a matter of an arrangement detecting the longitudinal dynamics of the motor vehicle. Sensors are provided which determine the longitudinal velocity of the vehicle and/or the longitudinal acceleration of the vehicle. In FIG. 1 to the measuring and evaluating arrangement 1 there is fed as input value 3 the vehicle longitudinal velocity 11. By differentiation it is possible to obtain from this an approximation value for the tire longitudinal forces $F_F$. There holds the relation:

$$F_L \sim m_{ges} \cdot \dot{v}_L,$$

in which $m_{ges}$ designates the mass of the vehicle and $v_L$ the longitudinal velocity of the vehicle.

Accordingly, on the output 4 of the measuring and evaluating arrangement 1 there stands an approximation value for the tire longitudinal forces $F_L$.

To the measuring and evaluating arrangement 2 there are supplied other input magnitudes 3. It is a matter here of the steering angle 12, the yawing velocity 13 and the transverse acceleration 14 of the vehicle. Possibly not all the input magnitudes are required. The input values 3 mentioned are likewise determined by suitable sensors. The measuring and evaluating arrangement 2 forms from the input values 3 an approximation value for the tire lateral forces $F_S$.

The tire longitudinal forces $F_L$ and the tire lateral forces $F_S$ are fed to the converting circuit 6. With the converting circuit 6 it is a matter of a stored value table which makes available on the output 7 in dependence on the input values regulator parameters RP which are fed to the regulator 8. As input values 9 the regulator 8, constructed preferably as a skyhook regulator, receives the spring deflection 15 or, in other words, the velocity of the vehicle body in the vertical direction and the relative displacement 16 between the body of the vehicle and the axle 16. By the latter there is meant the displacement path of an axle of the motor vehicle relative to the chassis or to the construction. On its output 10 the regulator makes available a signal for the setting of suitable actuators, with which there is accomplished the attuning of the vehicle properties. It can be a matter here of activiely or semiactively operating dampers.

Through the traveling state perception of the measuring and evaluating arrangements 1 and 2 it is possible in connection with semiactive or active undercarriage regulating systems to adjust the undercarriage properties according to the particular present operating state.

There an adjustment of the regulator parameters in uncritical traveling states occurs in such a way that a comfortable carriage lay-out is present. In critical traveling states there is provided a continuous transition of traveling safety-oriented layout of the regulator parameters. Accordingly, these critical traveling states are perceived by the sensors of the measuring and evaluating arrangements 1 and 2 and to the converting circuit 6 there are fed corresponding values for the tire longitudinal forces $F_L$ and/or tire lateral forces $F_S$. On the output 7 of the converting circuit 6 there are then issued corresponding regulator parameters RP, which influence the regulator 8 in such a way which respect to its transfer function that the signal given out on the output 10, controlling the actuators of the undercarriage performs a more rigid undercarriage tuning, serving for traveling safety. There the transition from a comfort-oriented undercarriage lay-out to the rigid tunning mentioned occurs continuously. The return to higher traveling comfort likewise occurs continuously.

FIG. 2 shows a limit curve for a semiactively regulated system with skyhook regulator and frequency-dependent damping. The comfort figure KA gives information about the undercarriage attuning. The greater the comfort figure is, the worse the comfort becomes; accordingly, the traveling safety improves. Simultaneously—as is to be seen from FIG. 2—the wheel load RL plotted on the abscissa falls. The arrow 17 shows, therefore, the tendency of the limit curve represented to greater traveling safety and the arrow 18 the direction toward greater traveling comfort. The values of the limit curve can be assumed by variation of the regulator parameters RP. It becomes clear, accordingly, that with the process of the invention, through the variation of the regulator parameters RP there can be made an undercarriage attuning for greater safety or greater traveling comfort.

We claim:

1. An undercarriage regulation apparatus for a vehicle having a vehicle body, comprising:
    at least one of a first sensor means for sensing at least one velocity of the vehicle body in a vertical direction to produce a first signal indicative thereof and a second sensor means for sensing at least one relative displacement between the vehicle body and at least one axle of the vehicle to produce a second signal indicative thereof;
    third sensor means for sensing at least one of a vehicle longitudinal velocity, vehicle longitudinal acceleration, vehicle transverse acceleration, yawing velocity and steering angle and outputting a third signal indicative thereof;
    a converting circuit for receiving said third signal and outputting at least one regulation parameter signal; and
    a regulator for receiving said regulation parameter signal and at least one of said first signal and said second signal, said regulator exhibiting one of at least two transfer functions dependent on said regulation parameter signal, said regulator including means for outputting a control signal to at least one actuator of the undercarriage for attuning undercarriage characteristics;
    wherein in noncritical travelling states, said regulation parameter signal is adjusted to provide a comfort-oriented attuning of said undercarriage characteristics, and in critical travelling states, said regulation parameter signal is adjusted utilizing one of a continuous and stepped transition to provide a safety-oriented attuning of said undercarriage characteristics.

2. The regulation apparatus according to claim 1, further comprising a measuring and evaluating device connected between said third sensor means and said converting circuit, and wherein a value of the vehicle longitudinal velocity and the vehicle longitudinal acceleration is utilized by said measuring and evaluating device to generate an approximation value for the tire longitudinal forces that is outputted from said measuring and evaluating device.

3. The regulation apparatus according to claim 2, wherein said approximation value for the tire longitudinal forces is inputted to said converting circuit, said regulation parameter signal dependent on said approximation value.

4. The regulation apparatus according to claim 3, wherein said converting circuit outputs said regulation parameter utilizing at least one of a stored value table and a computing operation.

5. The regulation apparatus according to claim 1, wherein the vehicle transverse acceleration, yawing velocity, and steering angle correspond to transverse dynamics of the vehicle.

6. The regulation apparatus according to claim 5, further comprising a measuring and evaluating device connected between said third sensor means and said converting circuit, and wherein a value of said transverse dynamics is utilized by said measuring and evaluating device to generate an approximation value for the tire lateral forces that is outputted from said measuring and evaluating device.

7. The regulation apparatus according to claim 6, wherein said approximation value for the tire lateral forces is inputted to said converting circuit, said regulation parameter signal dependent on said approximation value.

8. The regulation apparatus according to claim 7, wherein said converting circuit outputs said regulation parameter utilizing at least one of as stored value table and a computing operation.

9. The regulation apparatus according to claim 1, wherein said at least one actuator comprises at least on damper, and wherein said outputted control signal regulates the damping properties of said at least one damper.

10. An undercarriage regulation apparatus for a vehicle having a vehicle body, comprising:
   first sensor means for sensing a relative displacement between the vehicle body and a suspension member to produce a first signal indicative thereof;
   second sensor means for sensing at least one of a vehicle longitudinal velocity, vehicle longitudinal acceleration, vehicle transverse acceleration, yawing velocity and steering angle, and outputting a second signal indicative thereof; and
   a regulator for receiving said first signal and said second signal, said regulator exhibiting one of at least two transfer functions dependent on said second signal, said regulator including means for outputting a control signal based upon said first and second signals to at least one actuator of the undercarriage for attuning undercarriage characteristics, wherein in noncritical travelling states, said regulation parameter signal is adjusted to provide a comfort-oriented attuning of said undercarriage characteristics, and in critical travelling states, said regulation parameter signal is adjusted utilizing one of a continuous and stepped transition to provide a safety-oriented attuning of said undercarriage characteristics.

11. An apparatus for regulating an undercarriage of a vehicle, the undercarriage including at least one actuator and regulable in a travel-comfort mode and a travel-safety mode, the vehicle including a body and at least one axle, said apparatus comprising:
   at least one of a first sensor and a second sensor, said first sensor sensing at least one velocity of the vehicle body in a vertical direction and providing a first output signal corresponding thereto, said second sensor sensing at least one relative displacement between the vehicle body and an axle and providing a second output signal corresponding thereto;
   a third sensor sensing at least one of a vehicle longitudinal velocity, vehicle longitudinal acceleration, vehicle transverse acceleration, yawing velocity and steering angle and providing a third output signal corresponding thereto;
   a converting circuit for receiving said third output signal and providing an output signal representing a control parameter, wherein in noncritical travelling states, said control parameter is adjusted to provide a comfort-oriented attuning of said undercarriage characteristics, and in critical travelling states, said control parameter is adjusted utilizing one of a continuous and stepped transition to provide a safety-oriented attuning of said undercarriage characteristics in critical travel states; and
   a regulator for receiving said converter circuit output signal and at least one of said first and second output signals, said regulator having one of at least two transfer functions dependent on said converter circuit output signal and providing an output signal to said at least one actuator.

* * * * *